March 26, 1929.  C. C. SMITH  1,706,942
APPARATUS FOR CONTROLLING THE FILLING OF VESSELS WITH LIQUID
Filed July 3, 1928
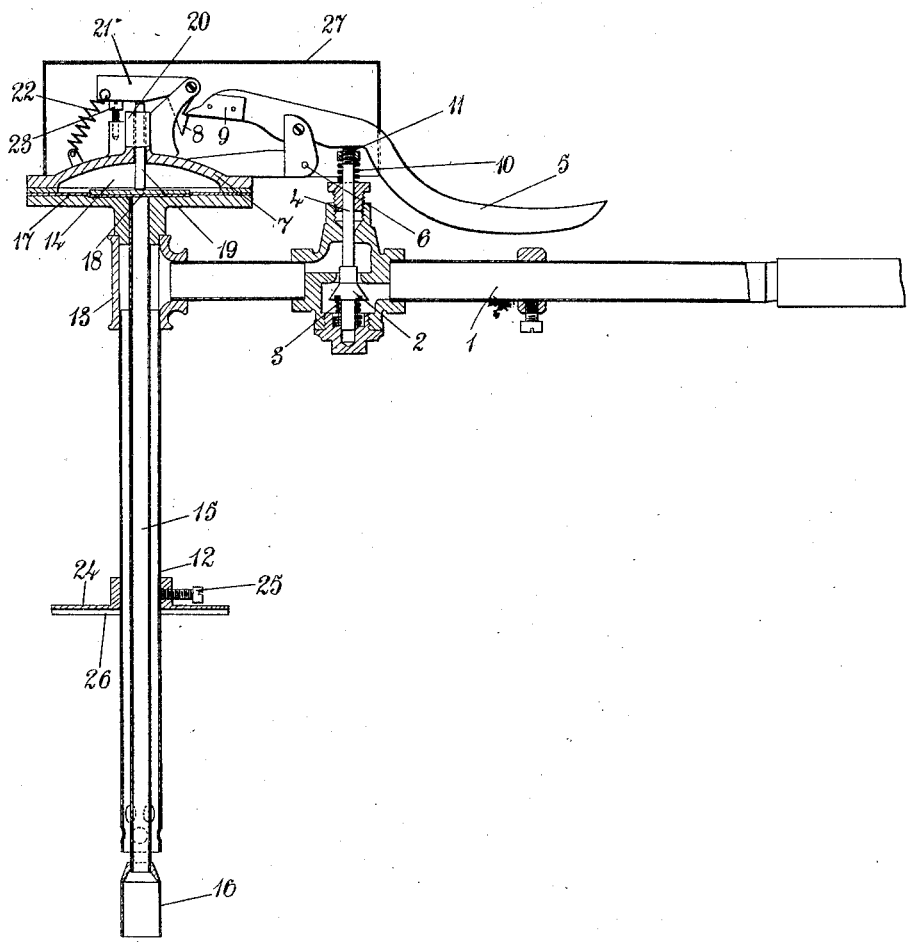

Patented Mar. 26, 1929.

1,706,942

UNITED STATES PATENT OFFICE.

CUTHBERT COATES SMITH, OF TWICKENHAM, ENGLAND, ASSIGNOR TO THE GENERAL MOTOR AND TYRE COMPANY, OF LONDON, ENGLAND.

APPARATUS FOR CONTROLLING THE FILLING OF VESSELS WITH LIQUID.

Application filed July 3, 1928, Serial No. 290,204, and in Great Britain June 30, 1927.

This invention relates to apparatus for filling vessels with liquids of the type in which means are provided for automatically cutting off the supply when the liquid has risen in the vessel to a predetermined level, such means being actuated by entrapping air in the vessel and utilizing the increase in pressure of such entrapped air to actuate mechanism controlling the supply valve.

The object of the invention is to provide an improved apparatus which is simple and inexpensive and also one which is reliable.

The invention is especially directed to, and advantageous in connection with, the supply of oil, spirits and all liquids into barrels, kegs and other containing vessels.

The invention also consists in an apparatus for cutting off the supply of liquid to a vessel being filled hereinafter described and defined by the claims.

The apparatus according to the invention comprises a filling pipe, a valve controlling said pipe, a diaphragm chamber having a conduit adapted to extend into the vessel being filled, and means co-operatively connecting the diaphragm to the valve whereby air is compressed in the conduit by liquid rising in the receptacle being filled to actuate the diaphragm to close the valve.

An adjustable flange may be mounted on the filling pipe to limit the insertion of the latter into the vessel being filled.

Further features of the invention will be hereinafter described and defined in the claims.

The accompanying drawing shows in cross section an apparatus constructed according to the invention.

In carrying the invention into effect according to one convenient mode, the filling tube 1 is provided with a valve 2, preferably a non-return valve, which is normally closed by the spring 3 and held in the closed position by such spring and the pressure of the liquid. The spindle 4 of this valve extends through a stuffing box and is engaged by the pivoted handle or lever 5 which is pivoted on an arm 6 carried by a diaphragm casing 7, hereinafter referred to. The valve is held in the open position by lever 5 which is retained in the lower position by a pivoted pawl or trigger 8 engaging the detent 9 on the lever 5. A second spring 10 may be provided surrounding the spindle 4 and adjustable by the nut 11.

A downwardly extending filling pipe 12, adapted to be inserted within the vessel to be filled, is connected to the pipe 1 by a union 13 to which is screwed or otherwise fixed a diaphragm casing 7.

The upper space 14 of the diaphragm chamber is open to atmosphere and the lower space is connected to a pipe or conduit 15 extending through the filling pipe 12, and preferably projecting below the lower end thereof. The pipe 15 may be provided with an enlargement 16. It will be noted that there is no communication between the filling pipe and the diaphragm chamber.

The diaphragm 17 is provided with a rigid centre portion 18 which may be a metallic plate which is adapted to contact with a spindle 19 which is loosely guided in the upwardly extending sleeve 20 of the diaphragm chamber.

The upper end of the spindle 19 is adapted to seat beneath the arm 21 of the pivoted pawl or trigger 8. A light spring 22 is provided for returning the trigger to its normal position, while a screw 23 is provided for determining such position, whereby the engagement between the parts 8 and 9 have the necessary engagement sufficient to retain the lever 5 in the "down" position.

An adjustable flange 24 is mounted upon the filling tube 12 whereby the tube may be inserted into the vessel being filled to the desired depth. The flange is held in position by the screw 25 and is provided with ridges 26 to provide an outlet for air from the vessel. A cover 27 is provided to prevent tampering with the mechanism.

In operation the pipe 12 is inserted within the vessel, the flange 24 having been adjusted if necessary, and the handle 5 moved to the "down" position, thus opening the valve 2. In this pivotal movement the nose 9 of the lever 5 slides over the trigger 8 which then locks it in the "down" position.

When the liquid in the vessel rises to the lower rim of the enlarged end 16 of the conduit 15 the air therein will be trapped and on further rise of the liquid such air will be compressed and finally the diaphragm raised, causing actuation of the trigger 8 and the release of the handle 5 with consequent closing of the valve 2 and shutting off the supply of liquid.

Although the diaphragm conduit or pressure tube 15 is mounted within the filling tube it may be mounted without such tube.

Having now described my invention what I claim as new and desire to secure by Letters Patent is:—

1. A filling nozzle comprising a vertical tubular member, a conduit communicating with said member, a valve in said conduit, spring means for normally holding said valve in closed position, a diaphragm casing secured to the upper end of said member and adapted to close said end, a diaphragm in said casing, a pipe in said tubular member extending below the lower end of said member, the upper end of said pipe opening into said diaphragm casing, a handle for opening said valve pivoted on said casing, a notched bell-crank lever pivoted to said casing and adapted when in one position to coact with said handle to hold said valve in open position, and means on said diaphragm for releasing said lever when a predetermined amount of liquid enters said pipe to close said valve.

2. A filling nozzle as claimed in claim 1, in combination with means for selectively limiting the movement of said lever.

In testimony whereof I have signed my name to this specification.

CUTHBERT COATES SMITH.